(12) United States Patent
Kohlert et al.

(10) Patent No.: US 8,578,509 B2
(45) Date of Patent: Nov. 5, 2013

(54) PACKAGING FILM FOR PRODUCT AUTHENTICATION, AUTHENTICATION METHOD AND SYSTEM

(75) Inventors: Christian Kohlert, Oberahr (DE); Bernd Schmidt, Gackenbach (DE); Walter Egenolf, Oetzingen (DE); Tamara Zistjakova, St. Petersburg (RU)

(73) Assignee: Kloeckner Pentaplast GmbH & Co. KG, Heiligenroth (DE)

( * ) Notice: Subject to any disclaimer, the term of this patent is extended or adjusted under 35 U.S.C. 154(b) by 176 days.

(21) Appl. No.: 12/997,895

(22) PCT Filed: Jul. 2, 2009

(86) PCT No.: PCT/EP2009/004771
§ 371 (c)(1),
(2), (4) Date: Dec. 14, 2010

(87) PCT Pub. No.: WO2010/003585
PCT Pub. Date: Jan. 14, 2010

(65) Prior Publication Data
US 2011/0164748 A1    Jul. 7, 2011

(30) Foreign Application Priority Data
Jul. 11, 2008    (DE) .......................... 10 2008 032 781

(51) Int. Cl.
*G06F 11/00*    (2006.01)
*G06F 12/14*    (2006.01)
*G06F 12/16*    (2006.01)
*G08B 23/00*    (2006.01)

(52) U.S. Cl.
USPC .......................................................... 726/32

(58) Field of Classification Search
USPC ............................................................ 726/32
See application file for complete search history.

(56) References Cited

U.S. PATENT DOCUMENTS

| 4,218,674 | A | 8/1980 | Brosow et al. |
| 7,256,425 | B2 * | 8/2007 | Weinert et al. .................. 257/77 |
| 7,279,234 | B2 * | 10/2007 | Dean ............................ 428/690 |
| 2005/0140495 | A1 | 6/2005 | Yamazaki et al. |
| 2006/0268259 | A1 | 11/2006 | Park |
| 2008/0075333 | A1 * | 3/2008 | Ericson et al. ................ 382/116 |

FOREIGN PATENT DOCUMENTS

| DE | 103 04 805 A1 | 8/2004 |
| DE | 60 2004 007 850 T2 | 8/2007 |
| EP | 1 475 242 A1 | 11/2004 |
| GB | 2 324 065 A1 | 10/1998 |
| WO | WO 02/50790 A1 | 6/2002 |

* cited by examiner

*Primary Examiner* — Kambiz Zand
*Assistant Examiner* — Stephen Sanders
(74) *Attorney, Agent, or Firm* — ProPat, L.L.C.

(57) ABSTRACT

A packaging film which contains pigment particles randomly distributed in a low surface-area density is used for the authentication of products. An imaging device is used to record a first digital image of a packaged product. The positional coordinates, and optionally the color values, of the pigment particles contained in the packaging film are determined from the digital image by means of a computer program and an identification code is calculated from the coordinate or color values and stored in a database. To authenticate the product at a later time, a second digital image is recorded and a test code is determined and compared with the recorded identification code.

24 Claims, 3 Drawing Sheets

PACKAGING FILM FOR PRODUCT AUTHENTICATION, AUTHENTICATION METHOD AND SYSTEM

CROSS-REFERENCE TO RELATED APPLICATIONS

This application is being filed under Rule 1.371 as a National Stage Application of pending International Application No. PCT/EP2009/004771 filed Jul. 2, 2009, which claims priority to the following parent application: German Patent Application No. 10 2008 032 781.6, filed Jul. 11, 2008, Both International Application No. PCT/EP2009/004771 and German Patent Application No. 10 2008 032 781.6 are hereby incorporated by reference herein in their entirety.

FIELD OF THE INVENTION

The present invention relates to a packaging film for product authentication and to an authentication method and system which are used in conjunction with the packaging film.

BACKGROUND OF THE INVENTION

Methods for the authentication of objects such as, for example, documents or banknotes are known in the prior art.

U.S. Pat. No. 4,218,674 discloses a system and a method for checking the authenticity of a document, wherein binary output signals generated on the basis of the document are compared with previously stored binary signals. The document contains a security marker in the form of randomly distributed fibers composed of a magnetic or magnetizable material. For the purpose of reading the security marker, the document is scanned along a predetermined track by means of a detector, which registers magnetic fields and outputs an electrical pulse upon crossing the magnetic or magnetized fibers.

DE 103 04 805 A1 describes a method for producing security markers, which utilizes a random pattern which is present on an object to be marked or is applied thereto. For this purpose, the random pattern is read into a computer by means of a reader and a fingerprint is extracted, which includes individual features of the pattern. Optionally, an identification number is applied on the object. The extracted fingerprint is stored in a mechanical data storage device. In order to identify the marked objects, the random pattern from the object is read in, the fingerprint is extracted and compared with the fingerprint stored in the data storage device.

DE 60 2004 007 850 T2 discloses a method, a computer program and an electronic device for determining the authenticity of an object, wherein the object has a three-dimensional pattern of randomly distributed particles. The method employs a first and second code. The second code is determined by two-dimensional data acquisition on the pattern of randomly distributed particles. For this purpose, the object is illuminated with white scattered light and the light reflected and transmitted by the object is detected. The object, comprising a pattern of randomly distributed particles, is preferably a label.

The security markers known in the prior art can be assigned to two groups:
(a) The security marker is an inherent constituent part of the product which arises randomly during production or is produced by means of targeted measures. In this case, narrow limits are imposed on the type and constitution of the marking on account of the material composition, surface structure and form of the product. Known product-inherent markers include, inter alia, optically detectable random surface patterns formed from scratches or fibers or precisely defined isotope admixtures in polymeric materials. Product-inherent security markers have a narrowly restricted field of use and are unsuitable for foodstuffs, medicaments, cosmetics and clothing textiles.
(b) The security marker is configured as a label and is fitted on the product. Labels have the disadvantage that they have a restricted area and facilitate the localization and identification of the security marker. By means of modern, commercially available instruments appertaining to metrology and analysis, the physicochemical constitution and the functional principle of the security marker can generally be determined rapidly. If the constitution and the functional principle are known, at best a copy protection stands in the way of counterfeiting. The prior art describes two methods for forming a copy protection, the two methods also being combined. Firstly, an "invisible" security marker is proposed and, secondly, a non-reproducible security marker or security marker that is reproducible only with a disproportionately high outlay is proposed.

With regard to the copy protection of security markers, the following aspects play an important part:
i) Reproducibility A security marker should as far as possible not be reproducible. In this case, the term "reproducible" should not be understood in the sense of an exact physical replication, but rather with regard to the metrological detection of specific patterns present in the security marker. Known security markers usually employ spatial—generally two-dimensional patterns such as smart codes, for example, which are detected by means of optical or magnetic detectors. Primarily holograms can be mentioned as an example of three-dimensional patterns. Less customary security markers comprise chemical markers such as isotopes, for example, which are detected by means of spectrometric measurement methods.

In order to reproduce a security marker, the pattern firstly has to be identified. The identification of a pattern can be made more difficult in various ways, inter alia by using a pattern which is not visible to the human eye. Hidden (so-called covert) patterns are thus proposed in the prior art. However, most of the known invisible patterns can be identified with little outlay by means of measurement methods available nowadays.

After identification it is necessary to recreate or reproduce the pattern in such a way that the reproduction is indistinguishable from the original during metrological detection. In principle, any identified pattern can be reproduced, but the outlay required for this purpose is accorded crucial importance. If the outlay on reproduction exceeds the economic advantage resulting therefrom, then the reproduction is not worthwhile and fails to occur. The outlay on reproduction is closely related to the metrological detection of the pattern. The simpler the metrological detection is made, the lower the outlay generally required on reproduction.

The information content of security markers is furthermore important. In this case, the term information content should be understood as a synonym for the number of structure details, such as points or lines, for instance. The higher the information content, the more outlay required for replication. The information content is upwardly limited by the area ratio of the security marker with respect to the size of the detail structures. The larger the area of the security marker and the smaller the detail structures, the greater the maximum possible information content.

ii) Metrological Detection

The metrological detection of security markers is generally effected at two or more locations and/or points in time, e.g. by the manufacturer of a product, if appropriate in a freight warehouse or during transport and by a trader or in the course of sales. In this case, a product is firstly equipped with a security marker in a marking step. The security marker or the pattern contained therein is generally not known a priori, but rather is detected metrologically and the measurement signal is recorded in encrypted or unencrypted form as an identity code. In a later identification step, a security marker situated on a product is detected metrologically in a manner similar to that in the marking step and the measurement signal in encrypted or unencrypted form is compared with existing identity codes.

During metrological detection, the product provided with a security marker is positioned under a detector or guided past a detector. This last is the case, for example, with laser scanners, magnetic read heads or cameras with a line sensor, such as are customary in industrial image processing. The positioning or movement of the product relative to the detector is effected manually or by means of a mechanical device such as a conveyor belt, for example. In this case, it is necessary to comply with specific stipulations on account of production-technological or logistical conditions. It is often necessary or desirable for the metrological detection to be effected in a contactless manner, wherein the working distance between the product and a detector must not fall below a minimum distance of from a few cm to a few meters. If the working distance is intended to be more than a few cm, preferably optical, in particular imaging, methods are used for the metrological detection. In this case, important measurement parameters such as resolution, image field and working distance cannot be set arbitrarily but rather influence one another in accordance with the laws of optics. In addition, albeit to a smaller extent, the choice of the measurement parameters is restricted by the camera lens used. With the camera lenses designed for industrial demands, in contrast to high-performance lenses for astronomical or satellite engineering applications, the possibilities of optical metrology cannot be fully exhausted.

The metrological detection of security markers has to satisfy different, in part contradictory, requirements; these include:

high sensitivity, such that slight deviations of a copied security marker from the original are recognized. In the case of optical detection of two-dimensional patterns, sensitivity means primarily high lateral resolution and contrast, that is to say that the optical measurement system used has to have an optimized modulation transfer function.

Immunity to metrological deviations in order that the false-positive error rate, that is to say the number of original security markers falsely recognized as reproduction, is low. A frequent metrological deviations during optical detection is incorrect positioning of the security marker relative to the detector, vibrations or different lighting conditions.

Low costs for procurement and operation of the measurement system.

High speed or high throughput.

Automation.

iii) Coding

In the present case, the term coding subsumes all known electronic and mathematical methods used in the metrological detection, conversion, encryption, storage and reproduction of security markers. These methods can be implemented in the form of electronic hardware or software. The volume of data used during coding is substantially determined by the information content of the security marker in conjunction with the resolution capability of the metrological detection. During the optical detection of two-dimensional patterns, the volume of data is upwardly limited by the product of the number of metrologically resolved pixels (resolution pixels) and the number of color or contrast levels per resolution pixel. Detailed structures of the security marker which are smaller than the resolution pixel cannot be detected and hence cannot be coded.

A central problem of the optical detection of two-dimensional security markers is briefly explained below. For the ratio of lateral resolution and depth of focus of a camera lens, the following relationship holds true to a good approximation:

$$\Delta z = \Delta x^2 / \lambda$$

where $\Delta z$ denotes the depth of focus, $\lambda$ denotes the wavelength of the light used for the imaging, and $\Delta x$ denotes the lateral resolution on the object side. The center of the visible light spectrum is at approximately 500 nm. If this value is inserted into the above equation, i.e. $\lambda = 500$ nm, this results in the following:

| $\Delta x$ [µm] | 1 | 5 | 10 | 15 | 20 | 30 | 40 | 50 | 60 |
|---|---|---|---|---|---|---|---|---|---|
| $\Delta z$ [µm] | 0.002 | 0.05 | 0.2 | 0.5 | 0.8 | 1.8 | 3.2 | 5.0 | 7.2 |

The depth of focus $\Delta z$ indicates the depth range in which two lines or points lying alongside one another at a distance $\Delta x$ on the security marker are still imaged as separate objects in the image plane. In order that a structure detail having a size of 40 µm is still imaged sharply, it must not be at a distance of more than 3.2 mm from the focal plane of the camera lens. Accordingly, the optical detection of security markers with a resolution of ≤40 µm requires precise positioning of the security marker relative to the detector with a tolerance of ≤3.2 mm. A small lateral offset or a small angular difference of the security marker during optical detection in the identification step relative to the marking step would bring about a false-positive error recognition. In order to avoid this problem during high-resolution optical detection, it is necessary to use high-precision mechanical positioning systems alongside a suitable camera lens. If this is compatible with logistical conditions, the use of precise mechanical positioning or transport systems is often prohibited for cost reasons.

It should additionally be taken into consideration that structure details having a size of around 40 µm are simple to reproduce by means of the technical possibilities available nowadays. This is because commercially available laser or inkjet printers for the private user already have resolutions of 600 to 2400 dpi (42 to 11 µm). Such printers are thus suitable for reproducing two-dimensional security markers with structure details in the range of 10 to 40 µm.

It is evident from the above explanations that security markers with very fine structure details of 40 µm are unsuitable for numerous commercial applications.

SUMMARY OF ADVANTAGEOUS EMBODIMENTS OF THE INVENTION

The object of the present invention is to overcome the abovementioned disadvantages of the known security markers and to provide a security marker which is suitable for commercial applications, can be detected with moderate metrological outlay and at the same time affords a high copy protection. This object is achieved by means of a packaging film in accordance with claim 1 and also an authentication method according to claim 12 and an authentication system in accordance with claim 17, which are used in conjunction with the packaging film.

The packaging film according to the invention comprises pigment particles, wherein the average number of the pigment particles per cm$^2$ of the packaging film is in the range of 1 to 100, and the pigment particles are present in a random distribution in the surface area of the packaging film. Preferably, the average number of pigment particles per cm$^2$ is 1 to 10, preferably 1 to 5, and in particular 1 to 2. The pigment particles have an average equivalent diameter in the range of 100 to 50 000 nm, where the term "equivalent diameter" denotes the diameter of a spherical particle of identical volume V (that is to say that the equivalent diameter corresponds to $2\times(0.75\times V/\pi)^{1/3}$). Preferably, the pigment particles are white or transparent in the spectral range of visible light of 380 to 750 nm. In one advantageous embodiment of the packaging film according to the invention, the pigment particles luminesce if they are irradiated with UV or infrared light, that is to say in the wavelength range of 100 to 380 nm or 750 to 2000 nm. Here and hereinafter, the term luminescence subsumes both phosphorescence and fluorescence. Pigment particles which can be excited to fluorescence in the visible wavelength range by irradiation with UV light are particularly suitable.

The pigment particles contain one or a plurality of substances, such as e.g. yttrium oxide or polymeric pigments. The colour of the luminescent light emitted by the excited pigment particles can be varied by means of corresponding substance mixtures. In another advantageous embodiment of the invention, the pigment particles emit visible light upon irradiation in the infrared wavelength range, in particular with infrared laser light. Pigment particles of this type contain phosphors for converting infrared radiation into visible light (so-called infrared-to-visible upconversion phosphors, abbreviated to IUP). One example of an IUP is $Er^{3+}$-activated yttrium fluoride having the general formula $Y_{1-x}Er_xF_3$, wherein x lies in the range of 0.05 to 0.3.

The packaging film according to the invention comprises one or a plurality of polymer layers and is produced by means of known production techniques such as (co)extrusion, calendering and mono- or biaxial stretching. During film production, the pigment particles are admixed with the polymeric raw materials such as resins, thermoplastics and the like. As an alternative thereto, the pigment particles are dusted onto a film layer or applied in a suspension and subsequently covered with a further film layer and/or fixed by calendering.

Preferably, the packaging film according to the invention is thermoformable. In a further embodiment advantageous for enveloping products, the packaging film is configured as a shrinkable film.

The total thickness of the packaging film according to the invention is 5 to 4000 μm, preferably 40 to 500 μm, and particularly preferably 60 to 200 μm.

The packaging film can have any desired color; it is preferably white or transparent.

The method according to the invention comprises a marking step and a recognition step, wherein in the marking step:
 a product is packaged with the packaging film according to the invention containing randomly distributed pigment particles as claimed in claims 1 to 11;
 an imaging device is used to record a first digital image of a first part of the packaged product, said first part comprising a first partial area of the packaging film;
 the first digital image is evaluated by means of a computer program, wherein the relative positional coordinates and optionally the color values of N1 pigment particles contained in the first partial area are determined;
 from the N1 pigment particles contained in the first partial area N pigment particles are selected by the random principle, where N is less than/equal to N1;
 an identity code is derived from the relative positional coordinates and optionally the color values of the N selected pigment particles in accordance with an encryption algorithm and the identity code is recorded; and
in the recognition step:
 an imaging device is used to record a second digital image of a second part of the packaged product, said second part comprising a second partial area of the packaging film said second partial area containing the first partial area;
 the second digital image is evaluated by means of the computer program, wherein the relative positional coordinates and optionally the color values of N2 pigment particles contained in the second partial area are determined; and
 from the N2 pigment particles contained in the second partial area, N2!/(N2−N)!·N! combinations of N mutually different pigment particles are formed and a check code is derived from the N relative positional coordinates and optionally the color values of each of said N2!/(N2−N)!·N! combinations in accordance with the encryption algorithm and is compared with recorded identity codes with regard to correspondence.

Here and hereinafter "N2!/(N2−N)!·N!" denotes the quotient of the factorial of N2 divided by the product of the factorials of (N2−N) and N, which is usually referred to as "N2 over N" in combinatorics.

In a development of the method according to the invention, the identity code comprises angle values of one or a plurality of polygons having m corners, wherein m is a natural number where 3≤m≤N and the coordinates of the polygon corners correspond to the relative positional coordinates of m pigment particles.

Advantageously, in the marking step, a label is applied on the packaging film.

In the marking step, the identity code is printed or transferred onto the packaging film, onto the label and/or into a database and is available for a later comparison, i.e. for the authentication.

The authentication system according to the invention comprises, alongside the packaging film in accordance with claims 1 to 11, a first and second imaging device and a first and second computer or a server with a program for processing digital images. Preferably, the authentication system comprises a database, wherein the first and second computers or the server are connected to the database. In a further configuration of the invention, the authentication system additionally comprises a label.

The packaging film according to the invention is used for enveloping products or for producing shaped bodies such as containers, bottles, cups, shells and the like. Said shaped bodies are produced from the packaging film by means of known methods, such as thermoforming. In order to produce substantially closed containers such as bottles, for instance, from the packaging film according to the invention, the packaging film is shaped directly after extrusion, e.g. by means of blow extrusion.

Preferably a thermoformable and often also shrinkable embodiment of the packaging film according to the invention is used for enveloping products, such as foodstuffs. Mono- or biaxially oriented, shrinkable embodiments of the packaging film according to the invention that are formed from polymeric materials, in particular such embodiments which are equipped with a sealable layer, are suitable for this purpose.

The invention is explained in greater detail below with reference to figures, in which, schematically:

DETAILED DESCRIPTION OF ADVANTAGEOUS EMBODIMENTS OF THE INVENTION

Figure 1A:
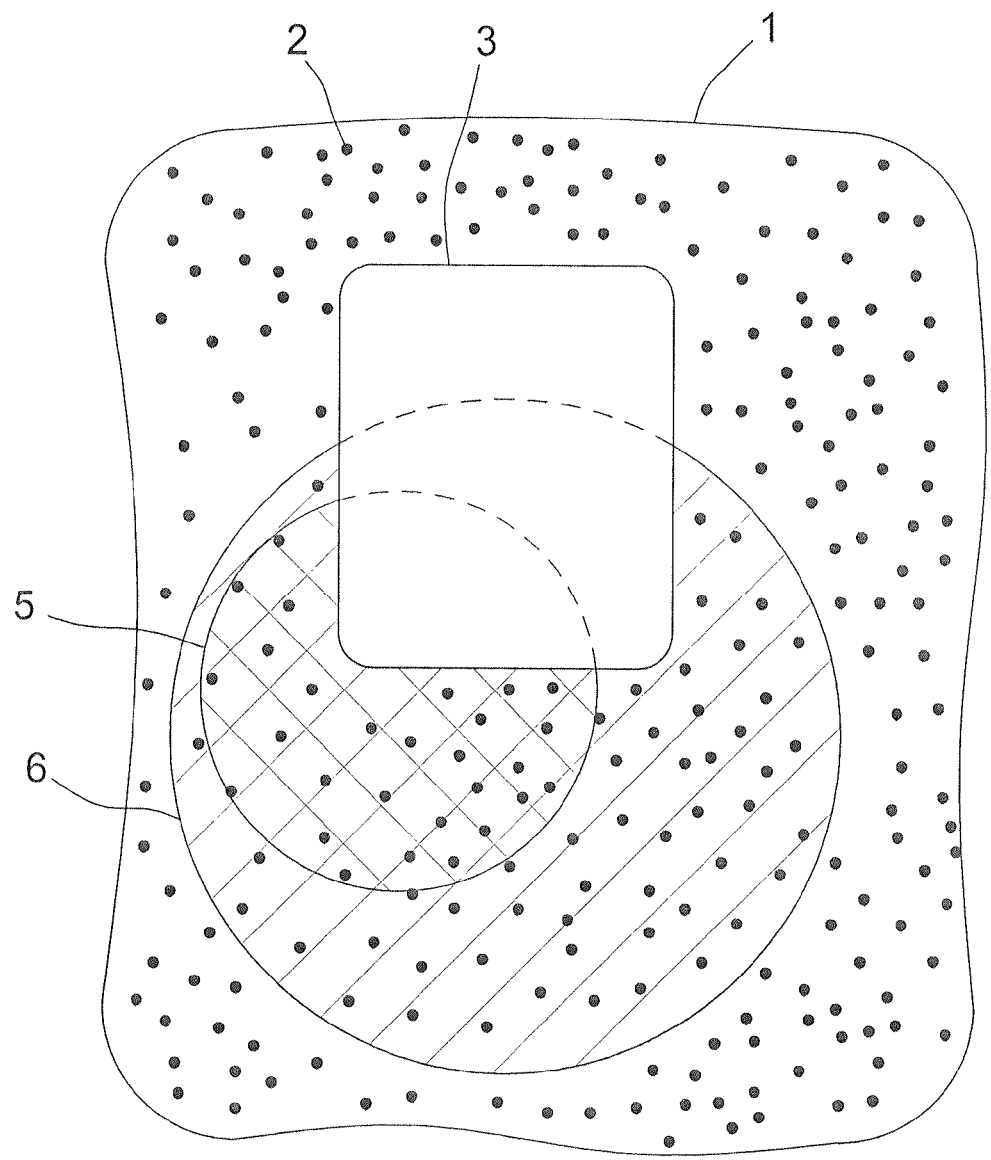
FIG. 1a shows a first excerpt from a packaging film according to the invention with pigment particles.

FIG. 1a schematically shows an excerpt from a packaging film 1 containing pigment particles 2. In a marking step a digital image of a first partial area 5 of the packaging film 1 is recorded by means of an imaging device and evaluated by means of a computer program. In a downstream identification step, a further digital image of a second partial area 6 which comprises the first partial area 5, is recorded and evaluated by means of the computer program. The partial areas 5 and 6 are highlighted by crossed and single line hatching, respectively, in FIG. 1a. The partial areas 5 and 6 contain N1 and N2 pigment particles, respectively. Since the second partial area 6 comprises the first partial area 5, the N1 pigment particles contained in the first partial area 5 form a subset of the N2 pigment particles contained in the second partial area 6, where N1≤N2 holds true. An optional label 3 applied to the packaging film 1 in the marking step is furthermore illustrated in FIG. 1a. In one advantageous embodiment of the method according to the invention, an identity code is printed onto the label 3 or onto the packaging film 1, said identity code being detected and evaluated in the identification step by means of an imaging device and computer program. The identity code is machine-readable and comprises various representation forms such as e.g. alphanumeric characters, smart code, matrix code or bar code.

Figure 1B:
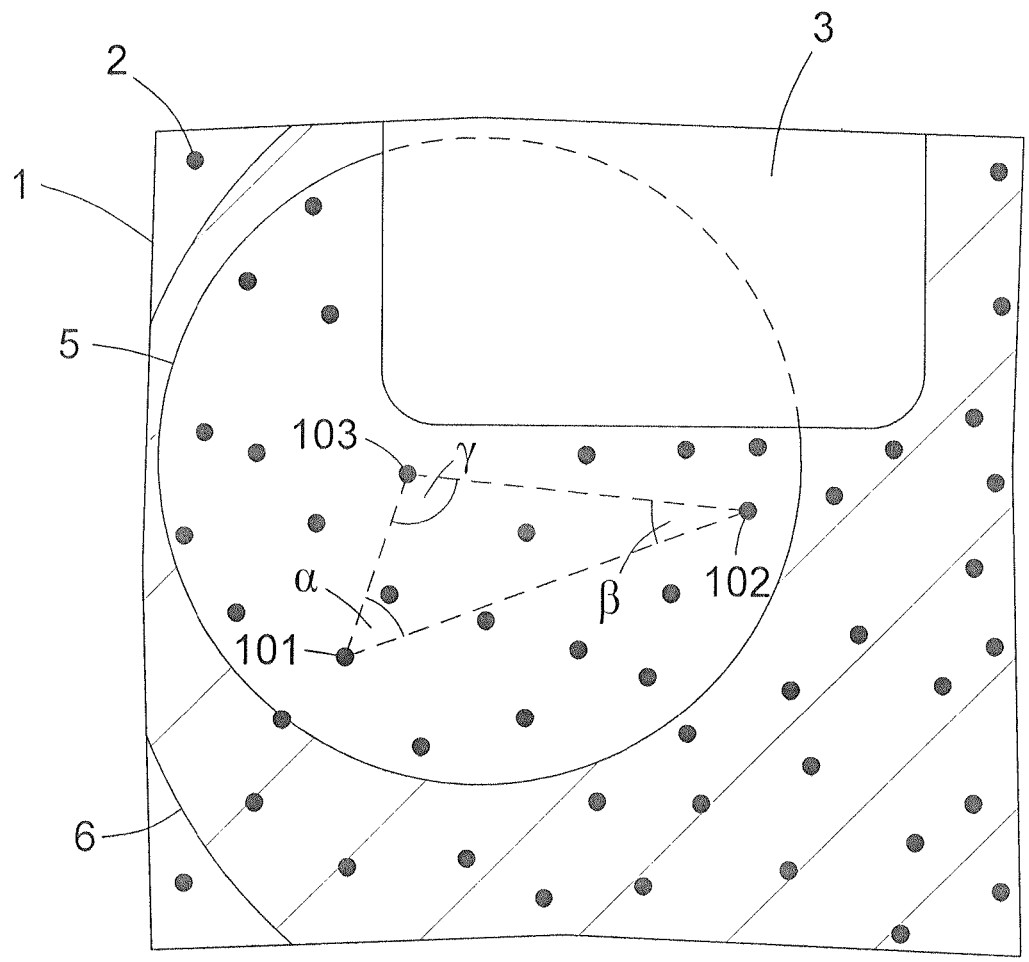
FIG. 1b shows a second excerpt from the packaging film with three randomly chosen pigment particles.

FIG. 1b schematically shows an enlarged excerpt from FIG. 1a wherein the reference symbols 1 to 6 have the same meaning. A triangle formed from three pigment particles (101, 102, 103) is additionally illustrated. In one advantageous embodiment of the method according to the invention, three pigment particles (101, 102, 103) are selected from the N1 pigment particles contained in the partial area 5, by means of a random-based algorithm, by the computer program used for the evaluation of the digital images. The relative positional coordinates of the three selected pigment particles (101, 102, 103), in particular the values of three angles ($\alpha, \beta, \gamma$) of the triangle formed by the pigment particles (101, 102, 103) are used for the identity code.

Figure 2:
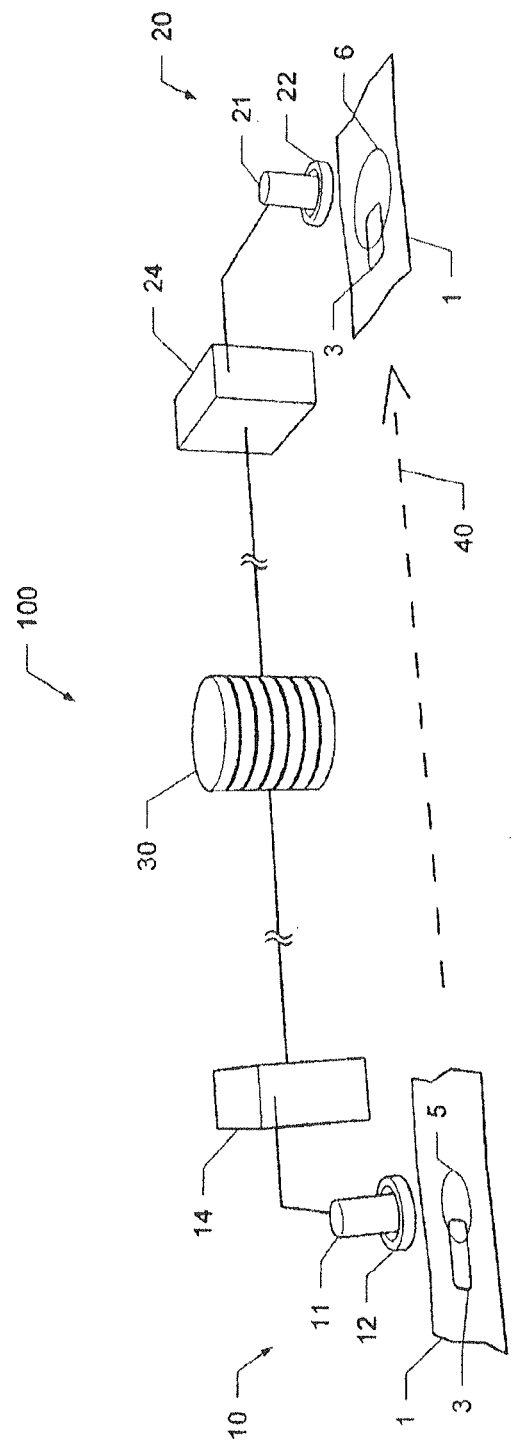
FIG. 2 shows an authentication system, comprising two imaging devices and a database.

FIG. 2 schematically shows an exemplary embodiment of an authentication system 100 according to the invention comprising packaging film 1, a first and second imaging device (10, 20) and a first and second computer (14, 24).

The first imaging device 10 and the first computer 14 are used in the marking step, that is to say generally directly after a product has been packaged with the packaging film 1. For the purpose of marking, from a first part of the packaged product, a digital image of a first partial area 5 of the packaging film 1 is recorded by means of the imaging device 10. In this case, the partial area 5 corresponds to the image field of the imaging device 10. The partial area 5 is chosen, if appropriate, such that a label 3 optionally used in the context of marking is partly or completely contained in the partial area 5. The imaging device 10 is connected to the computer 14. The digital image—recorded by means of the imaging device 10—of the partial area 5 and of the pigment particles contained therein is transferred to the computer 14 and evaluated there by means of a computer program having a module for image processing and a module for encryption. An encrypted identity code is then output by the computer program. Preferably, the identity code comprises information about the relative geometrical arrangement of the pigment particles with respect to one another, for example the angles of all the triangles formed by three pigment particles in each case. The identity code is stored in a database 30 connected to the first computer 14 and/or is transferred or printed onto the packaging film 1 or the label 3, preferably as an alphanumeric character string or in the form of a smart code.

Afterward, the product marked in such a way is sent to a recipient or transferred to an interim storage facility. This freight movement or the freight path between the marking step and a subsequent checking station is symbolized by a dashed arrow 40 in FIG. 2.

At the checking station, the authentication or identification of the packaged product is effected by means of the second imaging device 20 and the second computer 24 in a manner analogous to the marking. In this case, a digital image of a second partial area 6, which comprises the first partial area 5, and of the pigment particles contained therein is recorded and a check code is determined by means of the computer program, wherein the check code is determined according to the same algorithm as the identity code is determined in the marking step. The check code obtained in this way is compared with identity codes stored in the database 30. If the check code corresponds to an identity code, then the product is deemed to be authentic. In an alternative embodiment, the check code determined by the evaluation of the digital image is compared with an identity code printed onto the packaging film 1 or the label 3 in the marking step. In this alternative embodiment, the database 30 is not required. In order to determine the identity code printed onto the packaging film 1 or the label 3, the computer program is equipped with a module for character or pattern recognition.

In an alternative embodiment of the invention, the computer program for the evaluation of the digital images is executed on a server (not illustrated in FIG. 2) instead of on the computers (14, 24), wherein the computers (14, 24) are connected to the server via data lines or via the internet and communicate the digital images of the partial areas 5 and 6 to the server.

Preferably, the imaging device (10, 20) comprises a camera (11, 21) having a camera lens and a CCD or CMOS sensor. The CCD or CMOS sensor is a line or area sensor.

If a product packaged with the packaging film 1 is moved during image recording, e.g. by means of a conveyor belt, then the imaging device (10, 20) is operated, if appropriate, in the scanner mode, a CCD or CMOS line sensor advantageously being used. If it is necessary to achieve the highest possible resolution and contrast, the line sensor is operated according to the TDI principle (Time-Delay and Integration). Corresponding TDI sensors are commercially available.

In a particularly preferred embodiment of the authentication system 100 according to the invention, the imaging device (10, 20) comprises an illumination unit (12, 22), which emits UV light having wavelengths in the range of 100 nm to ≤380 nm or IR light having wavelengths of from greater than 750 nm to 2000 nm. Such an illumination unit (12, 22) serves for luminescence excitation of the pigment particles 2 distributed in the packaging film 1. Here and hereafter, the term luminescence excitation encompasses the emission of fluorescent or phosphorescent light excited by irradiation with light. The pigment particles 2 contain a substance having one or more luminescent absorption lines at least in one of the UV and/or infrared wavelength ranges specified above. Substances which fluorescence upon excitation with UV light in the visible range (380-750 nm) or so-called IUP (infrared upconversion phosphors), such as $Y_{1-x}Er_xF_3$ (where $0.05<x<0.3$), which convert infrared radiation into visible light, are particularly suitable.

Alongside the positional coordinates of the pigment particles, the color of the light emitted by the pigment particles can also be used for determining an identity and check code. For this purpose, use is made of the imaging device (10, 20) with a color sensor, preferably a CCD or CMOS sensor with an integrated color filter array, e.g. a Bayer matrix filter with three bandpass filters in the ranges red, green and blue (RGB). In the case of a color sensor with a Bayer matrix filter, a digital color pixel comprises in each case four cells—arranged in a 2×2 matrix of the CCD or CMOS area sensor, wherein a green color filter is arranged in front of two of the four cells and a red and a blue filter are respectively arranged in front of the two remaining cells. Millions of such color sensors are used in conventional digital cameras. As an alternative thereto, it is also possible to use a high-resolution 3-chip sensor wherein the image is divided by means of a prism along three sensors respectively equipped with a red, green and blue filter.

In this embodiment, a pigment particle is assigned a color value or an RCB, HSV value (=hue, saturation, value) or the like. The color value determined is then included in encrypted form in the identity and check code. In the case where the wavelength of the luminescent light emitted by the pigment particles is in the UV or infrared range, an imaging device (10, 20) suitable therefor is used, that is to say a UV or infrared camera.

Alongside the positional coordinates and the color of the luminescent light emitted by the pigment particles, the present invention additionally affords the possibility of including the decay time of the luminescent light as a parameter in the security marking. For this purpose, the illumination unit (12, 22) is designed to be switchable or for pulsed operation and the imaging device (10, 20) is equipped with an electronic controller for outputting trigger pulses and for time measurement.

The invention claimed is:

1. A packaging film for product authentication via relative positional coordinates of pigment particles, said film comprising pigment particles, wherein the average number of the pigment particles per $cm^2$ of the packaging film is in the range of 1 to 100; and the pigment particles are present in a random distribution in the surface area of the packaging film, and an identity code comprising the relative geometrical arrangement of the pigment particles with respect to one another is stored in a database and/or printed or transferred onto the packaging film or onto a label on said packaging film.

2. The packaging film as claimed in claim 1, wherein the average number of the pigment particles per $cm^2$ is in the range of 1 to 10.

3. The packaging film as claimed in claim 1, wherein the average equivalent diameter of the pigment particles is in the range of 100 to 50 000 nm.

4. The packaging film as claimed in claim 1, wherein the pigment particles are substantially transparent in the wavelength range of 380 to 750 nm.

5. The packaging film as claimed in claim 1, wherein the pigment particles are white.

6. The packaging film as claimed in claim 1, wherein the pigment particles have at least a luminescence in the wavelength range of from 100 to less than 380 nm.

7. The packaging film as claimed in claim 1, wherein the pigment particles have at least a luminescence in the wavelength range of from greater than 750 to 2000 nm.

8. A packaging film for product authentication via relative geometrical arrangement of pigment particles with respect to one another, said film comprising pigment particles, wherein the average number of the pigment particles per $cm^2$ of the packaging film is in the range of 1 to 100; and the pigment particles are present in a random distribution in the surface area of the packaging film and the pigment particles consist of yttrium oxide.

9. The packaging film as claimed in claim 1, wherein said film comprises one or a plurality of polymer layers.

10. The packaging film as claimed in claim 9, wherein said film is thermoformable or shrinkable and optionally printable.

11. The packaging film as claimed in claim 9, wherein said film is thermoplastic and said pigment particles have been dusted onto said film layer or applied in a suspension and covered with a further film layer and/or fixed by calendaring.

12. A method for the authentication of products, comprising a marking step and a recognition step, wherein the marking step comprises packaging a product with a packaging film containing randomly distributed pigment particles as claimed in claim 1;

recording a first digital image of a first part of the packaged product via an imaging device, said first part comprising a first partial area of the packaging film;

determining the relative positional coordinates and optionally the color values of N1 pigment particles contained in the first partial area by evaluation of the first digital image with a computer program;

selecting from the N1 pigment particles contained in the first partial area N pigment particles by random principle, where N is less than/equal to N1;

deriving an identity code from the relative positional coordinates and optionally the color values of the N selected pigment particles in accordance with an encryption algorithm and recording the identity code; and the recognition step comprises recording a second digital image of a second part of the packaged product via an imaging device, said second part comprising a second partial area of the packaging film, said second partial area containing the first partial area;

evaluating the second digital image by means of the computer program, wherein the evaluating step further comprises determining the relative positional coordinates and optionally the color values of N2 pigment particles contained in the second partial area; and forming, N2!/(N2−N)!·N! combinations of N mutually different pigment particles from the N2 pigment particles contained in the second partial area and deriving a check code from the N relative positional coordinates and optionally the color values of each of said N2!/(N2−N)!·N! combinations in accordance with the encryption algorithm and comparing the check code with recorded identity codes for correspondence.

13. The method as claimed in claim 12, wherein the identity code comprises angle values of one or a plurality of polygons having m corners, wherein m is a natural number where 3≤m≤N and the coordinates of the polygon corners correspond to the relative positional coordinates of m pigment particles.

14. The method as claimed in claim 12, wherein the marking step further comprises applying a label on the packaging film.

15. The method as claimed in claim 12, wherein the marking step further comprises transferring the identity code to the packaging film or the label.

16. The method as claimed in claim 12, wherein the marking step further comprises storing the identity code in a database.

17. An authentication system comprising a packaging film as claimed in claim 1, a first and second imaging device and a first and second computer or a server with a program for processing digital images.

18. The authentication system as claimed in claim 17, wherein said authentication system further comprises a database, and the first and second computers or the server are/is connected to the database.

19. The authentication system as claimed in claim 17, wherein said authentication system further comprises a label.

20. Enveloped products comprising packaging film as claimed in claim 1.

21. Shaped bodies comprising a packaging film as claimed in claim 1.

22. The packaging film as claimed in claim 2, wherein the average number of the pigment particles per $cm^2$ is in the range of 1 to 5.

23. The packaging film as claimed in claim 2, wherein the average number of the pigment particles per $cm^2$ is in the range of 1 to 2.

24. The packaging film as claimed in claim 1, wherein said particles define a plurality of polygons having m corners, wherein m is a natural number where 3 ≤m≤N and the coordinates of the polygon corners correspond to the relative positional coordinates of m pigment particles and the identity code comprises angle values of one or a plurality of said polygons.

* * * * *